UNITED STATES PATENT OFFICE.

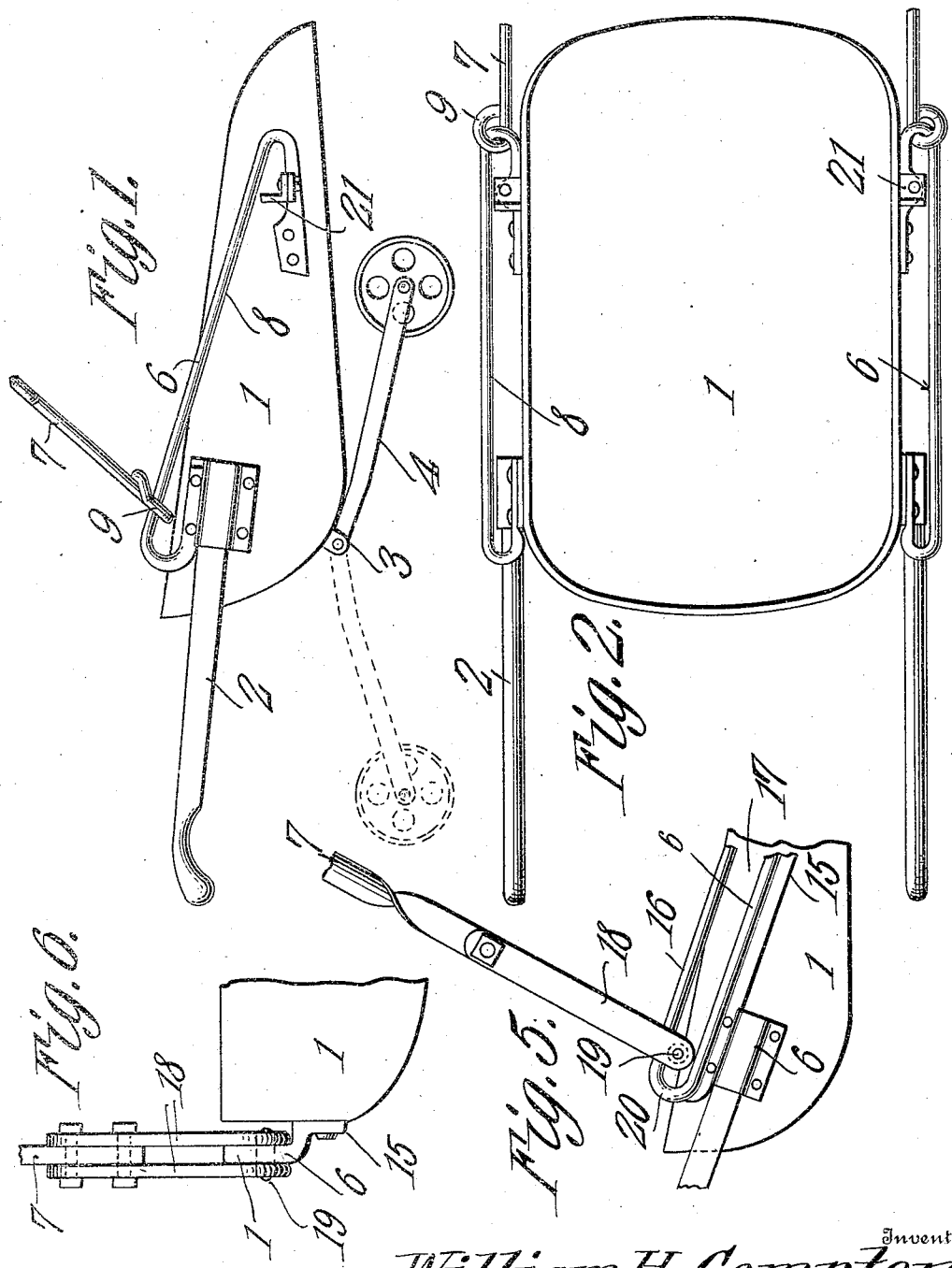

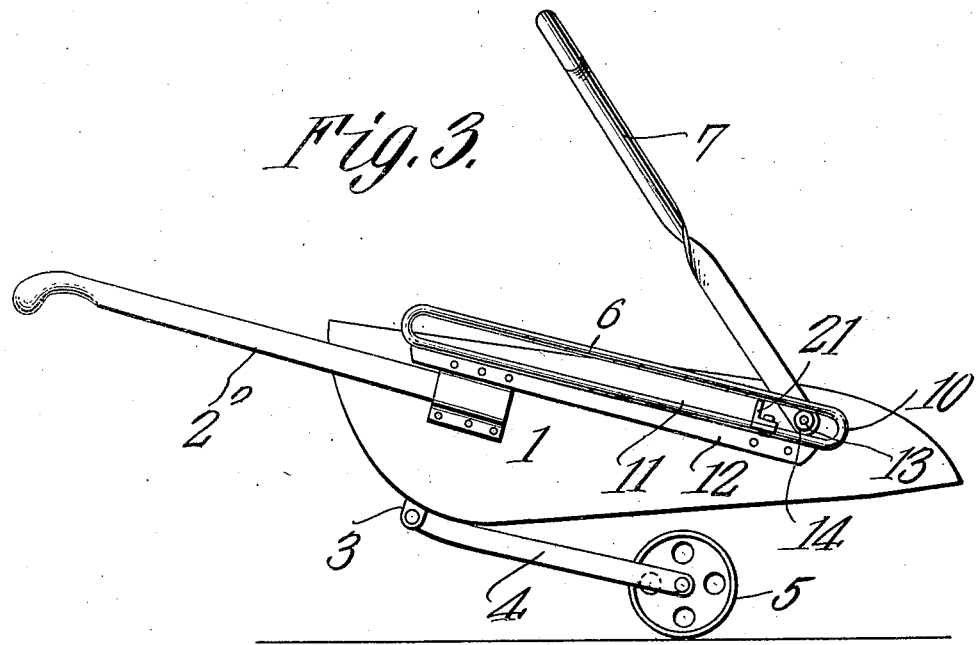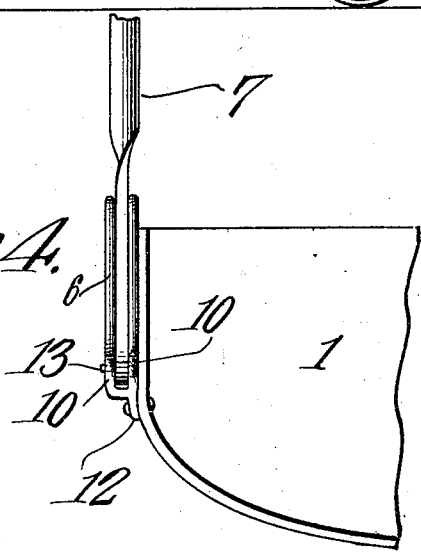

WILLIAM H. COMPTON, OF ORLEANS, INDIANA.

SCRAPER.

No. 893,709.　　　Specification of Letters Patent.　　　Patented July 21, 1908.

Application filed November 23, 1907. Serial No. 403,565.

*To all whom it may concern:*

Be it known that I, WILLIAM H. COMPTON, a citizen of the United States, residing at Orleans, in the county of Orange and State of Indiana, have invented a new and useful Scraper, of which the following is a specification.

This invention has relation to scrapers and it consists in the novel construction and arrangement of its parts as hereinafter shown and described.

The object of the invention is to provide a scraper with a means for pivotally attaching a bail thereto whereby the scraper may be readily tilted with relation to the bail for dumping or unloading and whereby the scraper will be held in proper relation to the bail while being loaded.

In order to accomplish the object above set forth the scraper is provided at its sides with guides which are pivotally engaged by the end portions of the bail. Said guides are inclined with relation to the bottom of the scraper and are disposed from an elevated point at the rear thereof downwardly toward the front edge of the scraper. Said guides are made in several forms and the ends of the bail are of such configuration or arrangement as to properly coöperate with the specific form of guide with which it is coupled.

The scraper is provided with a wheel journaled to an arm which in turn is pivoted to the bottom of the scraper. Said wheel is adapted to be swung under the scraper to sustain the weight of the same when it is being moved while unloaded and may be swung from under the scraper when the same is loaded and about to be moved.

Figure 1 is a side elevation of the scraper provided with one form of guide. Fig. 2 is a top plan view of the same. Fig. 3 is a side elevation of the scraper provided with another form of guide. Fig. 4 is an end elevation of a portion of scraper provided with the form of guide as illustrated in Fig. 3. Fig. 5 is a side elevation of a portion of a scraper provided with still another form of guide, and Fig. 6 is an end view of a portion of the scraper provided with the form of guide as illustrated in Fig. 5.

The scraper consists of the body 1 to which is attached the handles 2. The lugs 3 are attached to the bottom of the body 1 and the arm 4 is pivoted between the said lugs. The wheel 5 is journaled upon the arm 4. The guides 6 are attached to the sides of the body 1 and are inclined with relation to the bottom of the body 1 and are disposed from an elevated position at the rear portion of the said body in a downward direction toward the forward edge of the body. The ends of the bail 7 slidably engage the guides 6 and are also pivotally connected with the same.

In the form of the invention as shown in Fig. 1 the guides 6 consist of round rods 8 which are secured at their ends to the sides of the body 1 and which are spaced from the same at intermediate portions. The ends of the bail 7 are provided with the loops 9 which receive the intermediate portions of the rods 8, said loops 9 are adapted to slide along the intermediate portions of the rods 8 and permit the body 1 to tilt when they engage the end portions or curved portions of the rods 8. The extremities of the ends of the bail 7 are bent against and in engagement with the end portions of the said bail so that the loops 9 completely surround the rods 8 and are not liable to be twisted out of shape or position.

In the form of the invention, as shown in Fig. 3, the guides 6 consist of the parallel side parts 10, 10 having elongated perforations 11 and which are provided with the depending flange 12. The flange 12 is attached to the side of the body 1 and the ends of the bail 7 are provided with cross pins 13 having the friction rollers 14 journaled thereon. The pins 13 lie within the openings 11 of the adjacent side parts 10 while the friction rollers 14 engage the edges of the said openings 11. The lower end portions of the bail 7 operate in the spaces between the side parts 10 of the guides 6.

In the form of the invention, as shown in Fig. 5, the guides 6 are provided with the depending flanges 15 which are attached to the sides of the body 1 and with the side parts 16 which are spaced from the sides of the body 1 and which are provided with elongated openings 17. The arms 18 are bolted to the opposite sides of the ends of the bail 7 and are connected together at their lower portions by a cross pin 19 which passes transversely through the opening 17 and upon which is mounted a friction roller 20 which operates against the edges of the said opening.

In all the forms of the guides 6 described, the said guides are provided with detachable stops 21 which are adapted to be located near the forward ends of the guides for the purpose of preventing the lower ends of the bail 7 or their attachments from moving along and coöperating with the rear portions of the said guides. Thus, when it is desired to use the scraper, in the ordinary manner, and having pivotal movement only between the body 1 the stops 21 are placed in position upon the guides 6 and the ends of the bail 7 are prevented from moving along the rear portion of the said guides, while at the same time the bail has pivotal connection with the forward portion of the guides.

When it is desired that the bail should have movement longitudinally along the guides when the scraper is being unloaded, as for instance, when it is used in connection with a tripod or derrick for elevating the same over a wagon body or other receptacle the stops 21 are removed from the guides 6. Thus, when the rear portion of the body 1 is slightly elevated the guides 6 will move longitudinally along the ends of the bail 7 and the scraper is unloaded with less manual exertion than if the body 1 had pivotal movement only with relation to the ends of the bail.

Having thus described my invention, what I claim as new and desire to secure by Letters-Patent is:

1. A scraper, guides mounted upon the sides thereof, a bail slidably mounted upon the guides and being pivotally connected thereto.

2. A scraper, guides mounted upon the sides thereon and being inclined from the rear portion of the scraper downwardly toward the forward portion of the same, a bail slidably mounted upon a guide and being pivotally connected therewith.

3. A scraper, guides attached to the sides thereof, a bail slidably engaging the sides and being pivotally connected thereto and detachable stops adapted to be applied to the guides and entering the path of the bail.

4. A scraper, rods attached to the sides of the same and being spaced from the said sides, a bail having loops provided at its ends which receive the said rods and are adapted to slide upon the same.

5. A scraper, guides attached to the side of the same and consisting of spaced side parts having elongated openings, a bail having end portions which lie in the spaces between the side parts of the guides and a cross pin attached to the bail ends and projecting into said openings.

6. A scraper, guides attached to the same, and having flanges and portions spaced from the sides of the scraper, said portions being provided with elongated openings, a bail having arms attached to the opposite side of its ends, the lower portion of said arms lying upon the opposite sides of the spaced portions of the guides and pins connecting the lower portions of the arms together and passing through the openings in the guides.

In testimony that I claim the foregoing as my own, I have hereto affixed my signature in the presence of two witnesses.

WILLIAM H. COMPTON.

Witnesses:
 FRANK WORRELL,
 JAMES A. JENKINS.